United States Patent
Ogasawara (10) Patent No.: US 11,460,571 B2
(45) Date of Patent: Oct. 4, 2022

(54) SWITCHING CIRCUITS TO CALCULATE TRANSMISSION AND RECEPTION CIRCUIT DELAYS IN A DISTANCE MEASURING DEVICE

(71) Applicants: Kabushiki Kaisha Toshiba, Tokyo (JP); Toshiba Electronic Devices & Storage Corporation, Tokyo (JP)

(72) Inventor: Yosuke Ogasawara, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 397 days.

(21) Appl. No.: 16/811,495

(22) Filed: Mar. 6, 2020

(65) Prior Publication Data

US 2021/0072374 A1     Mar. 11, 2021

(30) Foreign Application Priority Data

Sep. 5, 2019 (JP) .............................. JP2019-162238

(51) Int. Cl.
  *H04B 1/44*    (2006.01)
  *G01S 13/14*   (2006.01)
  (Continued)

(52) U.S. Cl.
  CPC ............ *G01S 13/825* (2013.01); *G01S 7/352* (2013.01); *G01S 13/14* (2013.01); *H04B 1/44* (2013.01)

(58) Field of Classification Search
  CPC ........ G01S 13/825; G01S 7/352; G01S 13/14; G01S 7/4021; G01S 7/4052;
  (Continued)

(56) References Cited

U.S. PATENT DOCUMENTS 6,820,031 B1 * 11/2004 Hayakawa .............. G01S 13/84
                                                          340/573.1
2006/0066473 A1 *  3/2006 Yokoyama .............. G01S 7/023
                                                          342/134

(Continued)

FOREIGN PATENT DOCUMENTS

DE     102017100225 A1    7/2018
JP        2011-196938 A   10/2011
(Continued)

*Primary Examiner* — Donald H B Braswell
(74) *Attorney, Agent, or Firm* — Allen & Overy LLP (57) ABSTRACT

A distance measuring device according to an embodiment includes a filter, a first switching circuit, an impedance adjustable circuit, a second switching circuit, a third switching circuit, and a fourth switching circuit. The filter restricts a signal for distance measurement transmitted from the transmission circuit and a signal for distance measurement received by an antenna within a desired frequency band. The impedance adjustable circuit is adjusted to have a higher impedance than an impedance of the antenna. The second switching circuit switches conduction and non-conduction between the impedance adjustable circuit and the transmission circuit. The third switching circuit switches conduction and non-conduction between the impedance adjustable circuit and the reception circuit. The fourth switching circuit switches conduction and non-conduction between the impedance adjustable circuit and the second switching circuit and between the impedance adjustable circuit and the third switching circuit.

6 Claims, 7 Drawing Sheets

(51) Int. Cl.
*G01S 13/82* (2006.01)
*G01S 7/35* (2006.01)

(58) Field of Classification Search
CPC ........ G01S 7/4065; G01S 7/034; G01S 13/84; G01S 11/02; H04B 1/44; B60R 25/245; G07C 2209/63; G07C 9/00309; G07C 9/00944; G07C 2009/00555
See application file for complete search history.

(56) References Cited

U.S. PATENT DOCUMENTS

| | | | |
|---|---|---|---|
| 2008/0278370 | A1* | 11/2008 | Lachner ................ G01S 13/87 342/200 |
| 2018/0267154 | A1 | 9/2018 | Ootaka et al. |
| 2019/0369209 | A1* | 12/2019 | Vermeulen ............... G01S 7/40 |

FOREIGN PATENT DOCUMENTS

| | | | |
|---|---|---|---|
| JP | 4802979 | B2 | 10/2011 |
| JP | 2013-217754 | A | 10/2013 |
| JP | 2018-155724 | A | 10/2018 |

\* cited by examiner

SWITCHING CIRCUITS TO CALCULATE TRANSMISSION AND RECEPTION CIRCUIT DELAYS IN A DISTANCE MEASURING DEVICE

CROSS-REFERENCE TO RELATED APPLICATION

This application is based upon and claims the benefit of priority from the prior Japanese Patent Application No. 2019-162238 filed on Sep. 5, 2019; the entire contents of which are incorporated herein by reference.

FIELD

Embodiments described herein relate generally to a distance measuring device.

BACKGROUND

In a case in which distance measurement between a key and a vehicle is performed, it is not possible to obtain an accurate distance between the key and the vehicle without accurately obtaining a delay time of a circuit in a device and accurately compensating for the delay time.

DETAILED DESCRIPTION

A distance measuring device according to an embodiment includes a transmission circuit, a reception circuit, a filter, a first switching circuit, an impedance adjustable circuit, a second switching circuit, a third switching circuit, and a fourth switching circuit. The transmission circuit transmits a signal for distance measurement. The reception circuit receives the signal for distance measurement. The filter restricts the signal for distance measurement transmitted from the transmission circuit and a signal for distance measurement received by an antenna within a desired frequency band. The impedance adjustable circuit is adjusted to have a higher impedance than an impedance of the antenna. The second switching circuit switches conduction and non-conduction between the impedance adjustable circuit and the transmission circuit. The third switching circuit switches conduction and non-conduction between the impedance adjustable circuit and the reception circuit. The fourth switching circuit switches conduction and non-conduction between the impedance adjustable circuit and the second switching circuit and conduction and non-conduction between the impedance adjustable circuit and the third switching circuit.

Hereinafter, embodiments will be described in detail with reference to drawings.

First Embodiment

Figure 1:
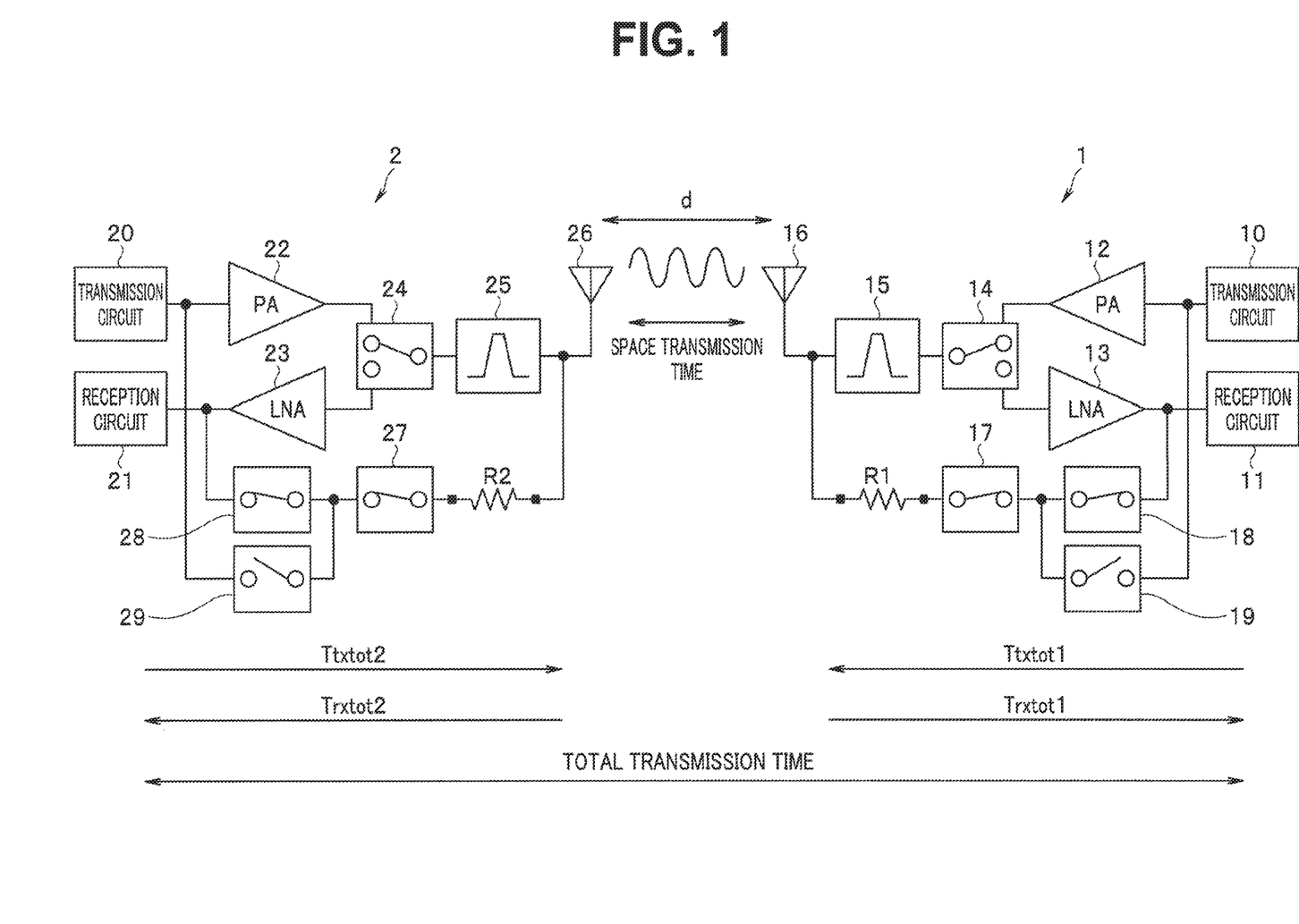
FIG. 1 is a block diagram illustrating a configuration of a distance measuring system that includes a distance measuring device according to a first embodiment.

FIG. 1 is a block diagram illustrating a configuration of a distance measuring system that includes a distance measuring device according to a first embodiment.

In recent years, many vehicles have employed keyless entry that makes it easy to lock and unlock the vehicles. According to the technology, doors are locked and unlocked using communication between keys of the vehicles and the vehicles. Further, smart entry systems capable of locking and unlocking doors without touching keys and starting engines using smart keys have also been employed in recent years.

However, cases in which attackers invade communication between keys and vehicles and steal the vehicles have often occurred. As a measure for protection from the aforementioned attack (so-called relay attack), a measure of measuring distances between the keys and the vehicles and inhibiting control of the vehicles through communication when the distances are determined to be equal to or greater than predetermined distances has been studied. For this reason, there has been a requirement to accurately measure the distances (distance measurement) between the keys and the vehicles. When an operation for the distance measurement between a key and a vehicle is performed, the distance measurement is performed by transmitting and receiving a signal for distance measurement between the key and the vehicle.

As illustrated in FIG. 1, a distance measuring system is configured to include a distance measuring device 1 and a distance measuring device 2. The distance measuring device 1 and the distance measuring device 2 are, for example, a vehicle and a key. The distance measuring device 1 and the distance measuring device 2 are disposed so as to be separated from each other by a distance d. At least one of the distance measuring device 1 and the distance measuring device 2 is freely movable, and the distance d changes corresponding to the movement.

The distance measuring device 1 is configured to include a transmission circuit 10, a reception circuit 11, a power amplifier (hereinafter, abbreviated as a PA) 12, a low-noise amplifier (hereinafter, abbreviated as an LNA) 13, a switch 14, a band pass filter (hereinafter, abbreviated as a BPF) 15, an antenna 16, a resistor R1, and switches 17, 18, and 19.

A resistance value of the resistor R1 disposed in a feedback path between the BPF 15 and the antenna 16 is sufficiently large with respect to a resistance value of the antenna 16. In a case in which the resistance value of the antenna 16 is 50Ω, for example, the resistance value of the resistor R1 is set to 1000Ω.

In other words, the resistor R1 is an impedance adjustable circuit adjusted to have a higher impedance than impedance of the antenna 16. Note that the impedance adjustable circuit adjusted to have a higher impedance than the impedance of the antenna 16 is not limited to the resistor R1 but may be an inductor that has a higher impedance than the impedance of the antenna 16.

The distance measuring device 2 is configured to include a transmission circuit 20, a reception circuit 21, a PA 22, an LNA 23, a switch 24, a BPF 25, an antenna 26, a resistor R2, and switches 27, 28, and 29.

The transmission circuit 10 outputs a signal for distance measurement to the PA 12. The PA 12 amplifies the signal for distance measurement input from the transmission circuit 10 and outputs the signal for distance measurement to the switch 14. At the time of the transmission, the switch 14 is switched to establish connection between the PA 12 and the BPF 15. Therefore, the signal for distance measurement is input to the BPF IS via the switch 14. The BPF 15 restricts the input signal for distance measurement within a desired frequency band and outputs the signal for distance measurement to the antenna 16, and the antenna 16 transmits the signal for distance measurement.

The signal for distance measurement output from the antenna 16 is received by the antenna 26 of the distance measuring device 2. The signal for distance measurement received by the antenna 26 is input to the BPF 25. The BPF 25 restricts the input signal for distance measurement within a desired frequency band and outputs the signal for distance measurement to the switch 24. At the time of the reception, the switch 24 is switched to establish connection between the BPF 25 and the LNA 23. Therefore, the signal for distance measurement is input to the LNA 23 via the switch 24. The LNA 23 amplifies the input signal for distance measurement with low noise and outputs the signal for distance measurement to the reception circuit 21.

If the signal for distance measurement is received by the reception circuit 21, then the transmission circuit 20 outputs the signal for distance measurement to the PA 22. The PA 22 amplifies the signal for distance measurement input from the transmission circuit 20 and outputs the signal for distance measurement to the switch 24. At the time of the transmission the switch 24 is switched to establish connection between the PA 22 and the BPF 25. Therefore, the signal for distance measurement is input to the BPF 25 via the switch 24. The BPF 25 restricts the input signal for distance measurement within a desired frequency band and outputs the signal for distance measurement to the antenna 26, and the signal for distance measurement is transmitted form the antenna 26.

The signal for distance measurement output from the antenna 26 is received by the antenna 16 of the distance measuring device 1. The signal for distance measurement received by the antenna 16 is input to the BPF 15. The BPF 15 restricts the input signal for distance measurement within a desired frequency band and outputs the signal for distance measurement to the switch 14. At the time of the reception, the switch 14 is switched to establish connection between the BPF 15 and the LNA 13. Therefore, the signal for distance measurement is input to the LNA 13 via the switch 14. The LNA 13 amplifies the input signal for distance measurement with low noise and outputs the signal for distance measurement to the reception circuit 11.

At the time of the distance measurement operation, the distance measuring device 1 transmits the signal for distance measurement from the transmission circuit 10 and obtains a total transmission time until the reception circuit 11 receives the signal for distance measurement. It is possible to calculate an accurate space transmission time by compensating for a delay time Ttxtot1 at the time of the transmission and a delay time Trxtot1 at the time of the reception of the distance measuring device 1 and a delay time Ttxtot2 at the time of the transmission and a delay time Trxtot2 at the time of the reception of the distance measuring device 2, which are obtained by a delay compensation operation, from the total transmission time. The distance measuring device 1 can calculate the accurate distance d between the distance measuring device 1 and the distance measuring device 2 on the basis of the accurate space transmission time.

Here, problems of the related art will be described on the basis of FIGS. 2A and 2B.

Figure 2A:
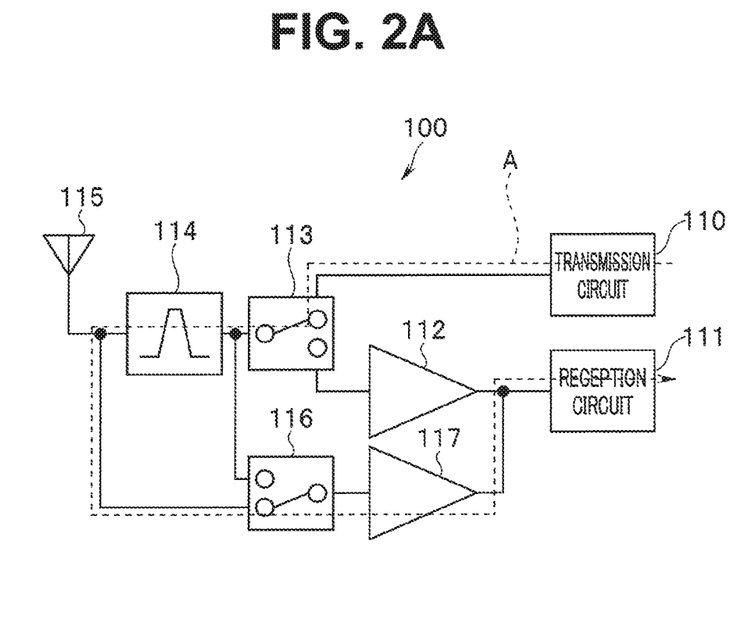
FIG. 2A is a block diagram illustrating an example of a configuration of a distance measuring device in the related art.
Figure 2B:
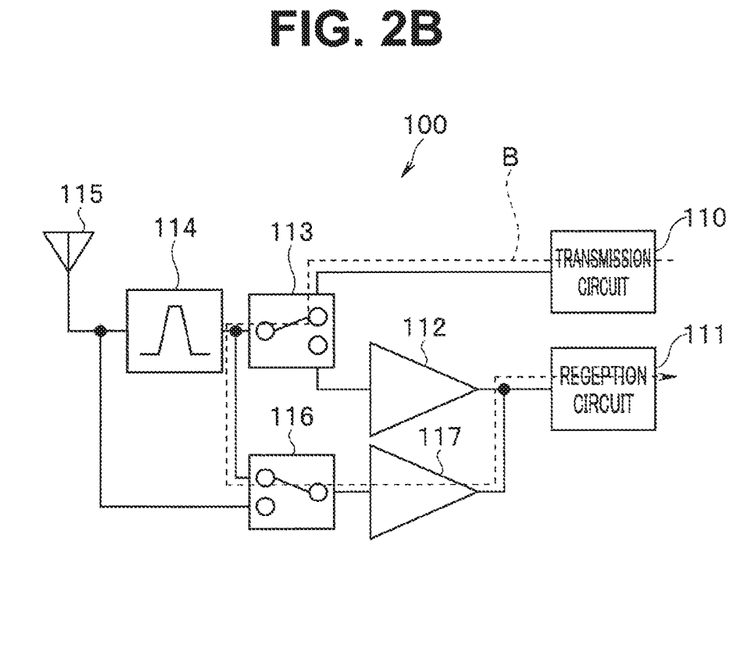
FIG. 2B is a block diagram illustrating an example of a configuration of a distance measuring device in the related art.

FIGS. 2A and 2B are block diagrams illustrating an example of a configuration of a distance measuring device in the related art.

As illustrated in FIGS. 2A and 2B, a distance measuring device 100 in the related art is configured to include a transmission circuit 110, a reception circuit 111, an amplifier 112, a switch 113, a BPF 114, an antenna 115, a switch 116, and an amplifier 117.

Typically, the BPF 114 configured to suppress frequency components other than frequency components near a desired frequency is inserted between the transmission circuit 110 and the antenna 115 and between the reception circuit 111 and the antenna 115. Since the BPF 114 is required to have steep frequency characteristics, the BPF 114 typically has a high order, and a delay of a signal passing through the BPF 114 is thus large. Therefore, it is not possible to accurately obtain the distance without compensating for the delay time of the BPF 114 at the time of the distance measurement. Thus, compensation for such a delay time of the BPF 114 is performed in the related art.

First, the switch 113 is switched to establish connection between an output of the transmission circuit 110 and an input of the BPF 114, the switch 116 is switched to establish connection between an output of the BPF 114 and an input of the amplifier 117, and a delay time Ta of a loop A is measured, as illustrated in FIG. 2A. Next, the switch 113 is switched to establish connection between the output of the transmission circuit 110 and the input of the BPF 114, the switch 116 is switched to establish connection between an output of the switch 113 and the input of the amplifier 117, and a delay time Tb of a loop B is measured, as illustrated in FIG. 2B. Then, a delay time of the BPF 114 is obtained from a difference between the delay time Ta of the loop A and the delay time Tb of the loop B. In this manner, the delay time of the BPF 114 with a large delay is obtained by measuring the delay time twice by switching the switch 113 and the switch 116 in the related art. However, it is not possible to obtain an accurate distance in the related art for the following reasons.

First, although the delay time of the loop B is measured without including the BPF 114, the delay time Tb is a delay that is larger than an accurate delay since the connection to the BPF 114 is not actually opened.

In addition, the delay time of the BPF 114 measured for the loop A is a delay time at the time of transmission, and a delay time at the time of reception is not measured. Specifically, the delay time of the BPF 114 at the time of transmission and the delay time of the BPF 114 at the time of reception are different delay times due to a difference in impedances of circuits before and after the BPF 114.

Further, it is difficult to define a delay time of the amplifier 112 in a previous stage of the reception circuit 111 as being equivalent to a delay time of the amplifier 117. In other words, it is not possible to accurately obtain the delay time of the amplifier 112 at the time of reception.

Finally, although it is possible to obtain the delay time of the BPF 114 from the difference between the delay time Ta of the loop A and the delay time Tb of the loop B, delays of circuits other than the BPF 114, such as the transmission circuit 110, the reception circuit 111, and the amplifier 112 in this case, are not taken into consideration.

Thus, the delay time at the time of transmission and the delay time at the time of reception are accurately measured by switching the switch 14, the switch 17, the switch 18, and the switch 19 to measure delay times of a loop C, a loop D, and a loop E three times in the embodiment.

Figure 3A:
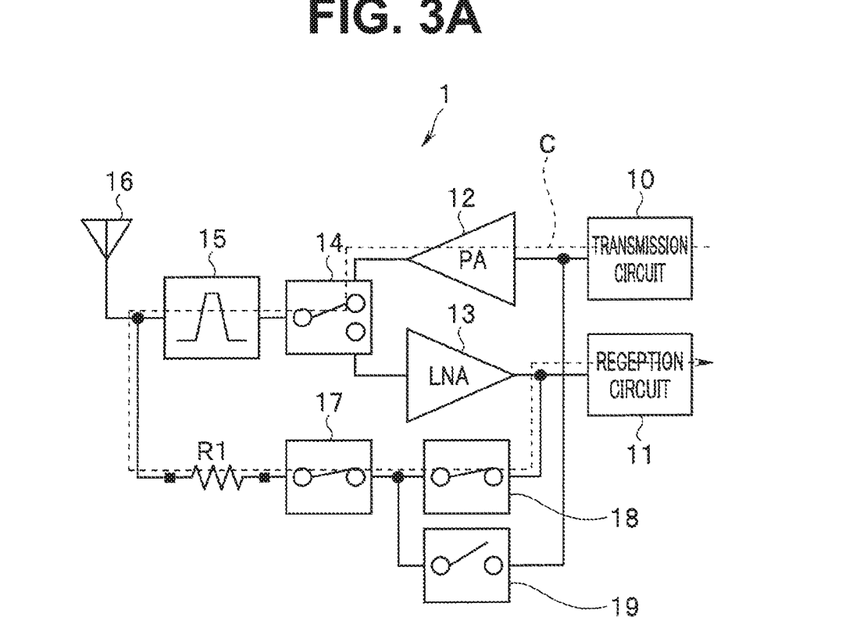
FIG. 3A is a block diagram for explaining a state of a distance measuring device 1 in which a route of a loop C is formed.
Figure 3B:
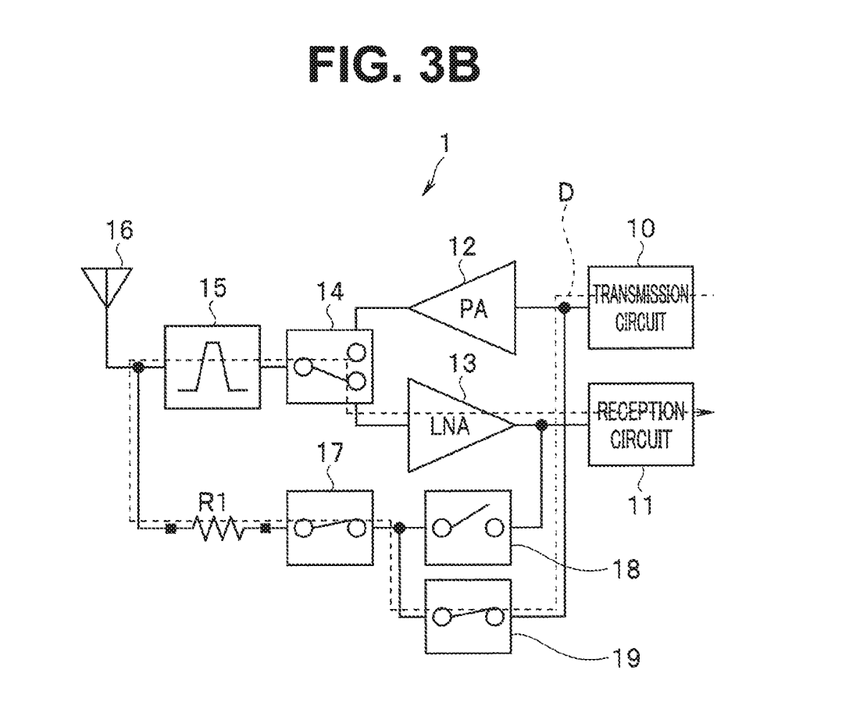
FIG. 3B is a block diagram for explaining a state of the distance measuring device 1 in which a route of a loop D is formed.
Figure 3C:
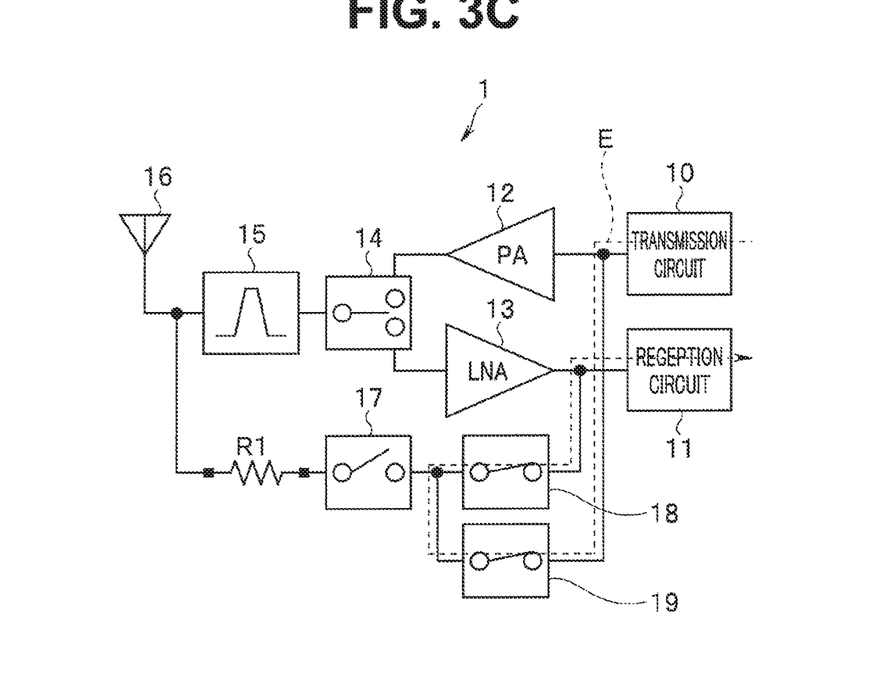
FIG. 3C is a block diagram for explaining a state of the distance measuring device 1 in which a route of a loop E is formed.

Calculation of the delay time at the time of transmission and a delay time at the time of reception will be described on the basis of FIGS. 3A, 3B, and 3C. FIG. 3A is a block diagram for explaining a state of the distance measuring device 1 in which the route for the loop C is formed, FIG. 3B is a block diagram for explaining a state of the distance measuring device 1 in which a route for the loop D is formed, and FIG. 3C is a block diagram for explaining a state of the distance measuring device 1 in which a route for the loop E is formed.

Note that since delay times of the switch 14, the switch 17, the switch 18, the switch 19, and the resistor R1 are significantly small, the delay times will be ignored. It is assumed that a delay time of the BPF 15 at the time of transmission and a delay time of the BPF 15 at the time of reception are different from each other. In the embodiment, the delay time of the BPF 15 at the time of transmission is defined as Tfil', and the delay time of the BPF 15 at the time of reception is defined as Tfil". In this case, the delay time Ttxtot1 at the time of transmission is a time obtained by adding a delay time Ttx of the transmission circuit 10, a delay time Tpa of the PA 12, and the delay time Tfil' of the BPF 15 at the time of transmission. The delay time Trxtot1 at the time of reception is a time obtained by adding the delay time Tfil" of the BPF 15 at the time of reception, a delay time Tlna of the LNA 13, and a delay time Trx of the reception circuit 11.

First, the switch 14 is switched to establish connection between the PA 12 and the BPF 15 as illustrated in FIG. 3A. Then, the switch 17 and the switch 18 are turned on, the switch 19 is turned off, and the route for the loop C is thus formed.

At this time, the switch 14 configures a first switching circuit configured to switch a route between the transmission circuit 10 and the antenna 16 and a route between the reception circuit 11 and the antenna 16. The switch 19 configures a second switching circuit configured to switch conduction and non-conduction between the resistor R1 and the transmission circuit 10. The switch 18 configures a third switching circuit a third switching circuit configured to switch conduction and non-conduction between the resistor R1 and the reception circuit 11. The switch 17 configures a fourth switching circuit configured to switch conduction and non-conduction between the resistor R1 and the switch 19 and conduction and non-conduction between the resistor R1 and the switch 18.

A delay time Tc of the loop C is a time obtained by adding the delay time Ttx of the transmission circuit 10, the delay time Tpa of the PA 12, the delay time Tfil' of the BPF 15 at the time of transmission, and the delay time Trx of the reception circuit 11. In other words, the delay time Tc of the loop C is represented by Equation (1) below.

$$Tc = Ttx + Tpa + Tfil' + Trx \quad (1)$$

Next, the switch 14 is switched to establish connection between the LNA 13 and the BPF 15 as illustrated in FIG. 3B. Then, the switch 17 and the switch 19 are turned on, the switch 18 is turned off, and the route for the loop D is thus formed.

A delay time Td of the loop D is a time obtained by adding the delay time Ttx of the transmission circuit 10, the delay time Tfil" of the BPF 15 at the time of reception, the delay time Tlna of the LNA 13, and the delay time Trx of the reception circuit 11. In other words, the delay time Td of the loop D is represented by Equation (2) below.

$$Td = Ttx + Tfil'' + Tlna + Trx \quad (2)$$

Next, the switch 14 is opened as illustrated in FIG. 3C. Then, the switch 18 and the switch 19 are turned on, the switch 17 is turned off, and the route for the loop E is thus formed.

A delay time Te of the loop E is a time obtained by adding the delay time Ttx of the transmission circuit 10 and the delay time Trx of the reception circuit 11. In other words, the delay time Te of the loop E is represented by Equation (3) below.

$$Te = Trx + Ttx \quad (3)$$

Here, Tc+Td−Te is calculated.

$$\begin{aligned} Tc + Td - Te &= (Ttx + Tpa + Tfil' + Trx) + \\ &\quad (Ttx + Tfil'' + Tlna + Trx) - \\ &\quad (Trx + Ttx) \\ &= Ttx + Tpa + Tfil' + Tfil'' + Tlna + Trx \\ &= Ttxtot1 + Trxtot1 \end{aligned}$$

In this manner, the delay time Ttxtot1 at the time of transmission and the delay time Trxtot1 at the time of reception are measured by measuring the delay times three times, that is, the delay time Tc of the loop C, the delay time Td of the loop D, and the delay time Te of the loop E, in this embodiment, and by calculating Tc+Td−Te.

In the embodiment, the resistance value of the resistor R1 is a value that is sufficiently large with respect to the resistance value of the antenna 16. In this manner, an unnecessary difference in delay at the time of the distance measurement operation and the delay compensation measurement, that is, due to a difference in impedances caused by turning on and off the switch 17 is eliminated by setting an input and output impedance of the feedback path from a part between the BPF 15 and the antenna 16 to be sufficiently large, and the delay time is thus accurately measured.

The delay time Tfil' of the BPF 15 at the time of transmission is measured using the delay time Tc of the loop C, the delay time Tfil" of the BPF 15 at the time of reception is measured using the delay time Td of the loop D, and an error in delay times of the BPF 15 at the time of transmission and reception is eliminated.

Therefore, according to the distance measuring device in the embodiment, it is possible to accurately compensate for the delay time of the circuit in the device and to obtain an accurate distance.

In addition, it is possible to accurately obtain the delay time Ttxtot2 at the time of transmission and the delay time Trxtot2 at the time of reception by similarly performing measuring in the distance measuring device 2, measuring a delay time Tf of a loop F, a delay time Tg of a loop G, and a delay time Th of a loop H, and calculating Tf+Tg−Th. As a result, the distance measuring system can obtain an accurate space transmission time and to obtain the accurate distance d between the distance measuring device 1 and the distance measuring device 2.

Second Embodiment

Next, a second embodiment will be described.

Figure 4:
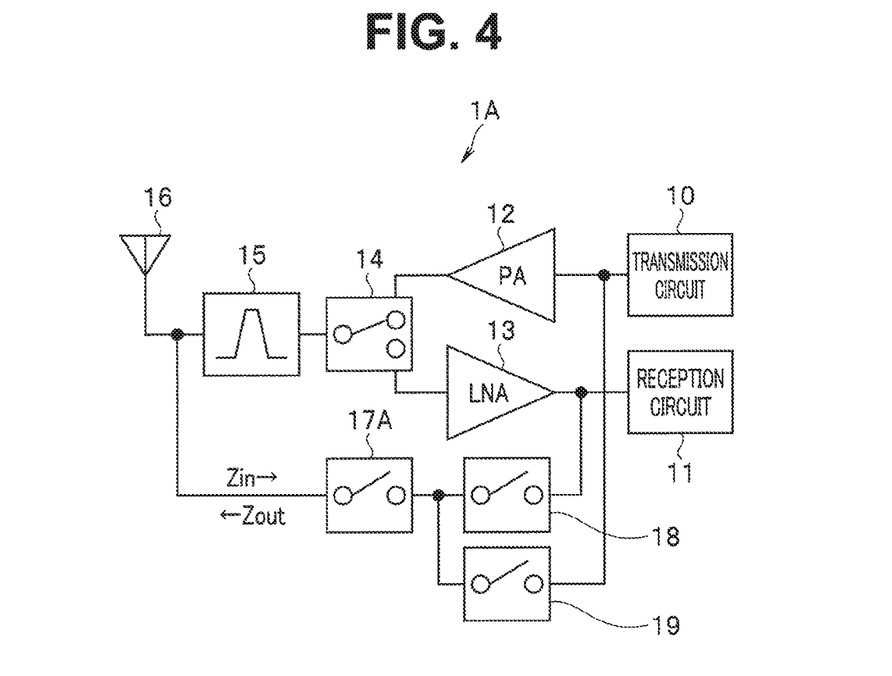
FIG. 4 is a block diagram illustrating a configuration of a distance measuring device according to a second embodiment.

FIG. 4 is a block diagram illustrating a configuration of a distance measuring device according to the second embodiment. The same reference numerals will be given to components in FIG. 4 that are similar to the components in FIG. 3A, and description will be omitted.

A distance measuring device 1A according to the embodiment is configured such that the resistor R1 is deleted from the distance measuring device 1 in FIG. 3A and a switch 17A is used instead of the switch 17. The other components are similar to the components in the first embodiment.

The switch 17A according to the embodiment is a switch using a transistor with a high ON resistance, for example. In this manner, an input and output impedance of the switch 17A is set to be higher than an impedance of the antenna 16.

As a result, the distance measuring device 1A can obtain similar effects to effects of the first embodiment without using the resistor R1 of the distance measuring device 1 in the first embodiment.

Third Embodiment

Next, a third embodiment will be described.

Figure 5:
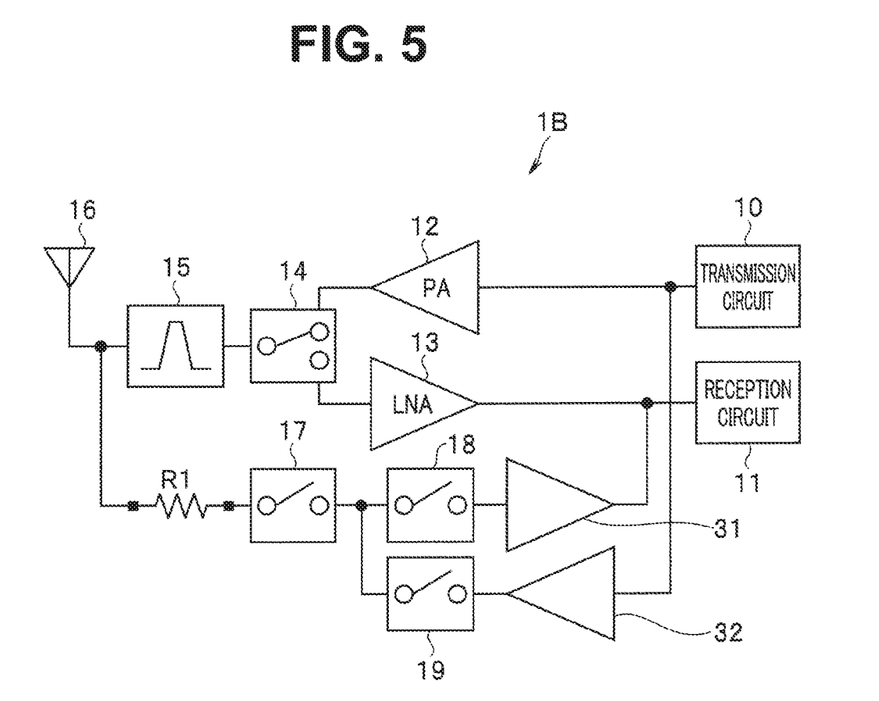
FIG. 5 is a block diagram illustrating a configuration of a distance measuring device according to a third embodiment.

FIG. 5 is a block diagram illustrating a configuration of a distance measuring device according to the third embodiment. The same reference numerals will be given to components in FIG. 5 that are similar to the components in FIG. 3A, and description will be omitted.

As illustrated in FIG. 5, a distance measuring device 1B according to the embodiment is configured such that signal processing circuits 31 and 32 are added to the distance measuring device 1 in FIG. 3A. Specifically, the signal processing circuit 31 is added between the switch 18 and the reception circuit 11, and the signal processing circuit 32 is added between the switch 19 and the transmission circuit 10.

The signal processing circuits 31 and 32 are circuits configured to perform desired signal processing and are each configured of an amplifier or an attenuator, for example. In this manner, in the distance measuring device 1B, it is possible to dispose other circuits (signal processing circuits 31 and 32) in addition to the resistor R1, the switches 17, 18, and 19 to a feedback path of a signal.

It is possible to keep gains of the loops C, D, and E constant and to achieve satisfactory characteristics by disposing such signal processing circuits 31 and 32.

Fourth Embodiment

Next, a fourth embodiment will be described.

Figure 6:
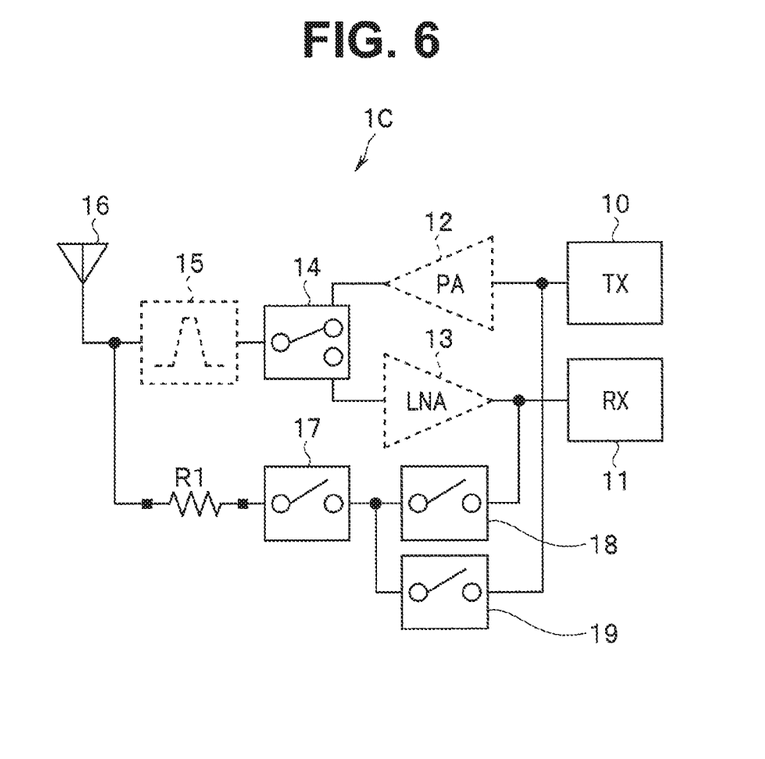
FIG. 6 is a block diagram illustrating a configuration of a distance measuring device according to a fourth embodiment.

FIG. 6 is a block diagram illustrating a configuration of a distance measuring device according to the fourth embodiment. The same reference numerals will be given to components in FIG. 6 that are similar to the components in FIG. 3A, and description will be omitted.

As illustrated in FIG. 6, a distance measuring device 1C according to the embodiment may be configured such that at least one circuit of the PA 12, the LNA 13, and the BPF 15 is not included. It is a matter of course that the distance measuring device 1C may be configured such that none of the PA 12, the LNA 13, and the BPF 15 is included.

Fifth Embodiment

Next, a fifth embodiment will be described.

Figure 7:
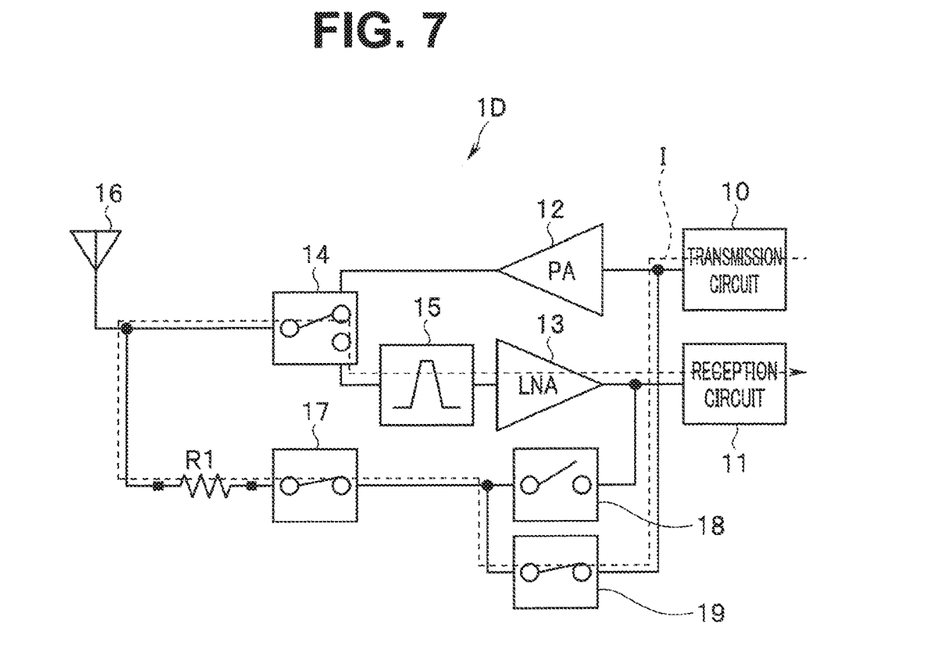
FIG. 7 is a block diagram illustrating a configuration of a distance measuring device according to a fifth embodiment.

FIG. 7 is a block diagram illustrating a configuration of a distance measuring device according to the fifth embodiment. The same reference numerals will be given to components in FIG. 7 that are similar to the components in FIG. 3A, and description will be omitted.

As illustrated in FIG. 7, a distance measuring device 1D according to the embodiment includes the BPF 15 disposed between the LNA 13 and the switch 14. In other words, the BPF 15 is used only at the time of reception. The other components are similar to the components in the first embodiment.

In a case in which it is possible to ignore a delay time of the PA 12, a delay time of only a loop 1 is measured only once. In this manner, the delay time Ttx of the transmission circuit 10, the delay time Tfil" of the BPF 15 at the time of reception, the delay time Tlna of the LNA 13, and the delay time Trx of the reception circuit 11 can be obtained.

Since the distance measuring device ID according to the embodiment measures the delay time of only the loop 1 only once, it is possible to shorten a measurement time of the delay time as compared with a case in which delay times are measured three times.

Note that the distance measuring device ID can also measure the delay time of the PA 12 by switching the switches 14, 17, 18, and 19 and measuring the delay times three times similarly to the first embodiment. Since the delay time of the PA 12 can also be measured by measuring the delay times three times, it is possible to improve accuracy in measuring the distance.

Sixth Embodiment

Next, a sixth embodiment will be described.

Figure 8A:
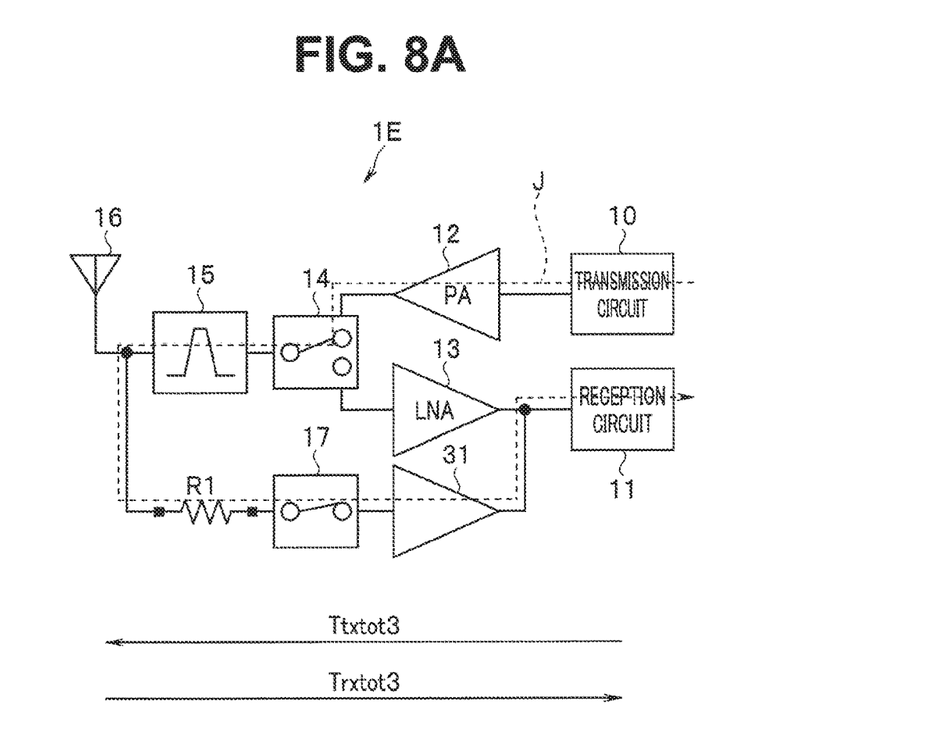
FIG. 8A is a block diagram illustrating a configuration of a distance measuring device according to a sixth embodiment.
Figure 8B:
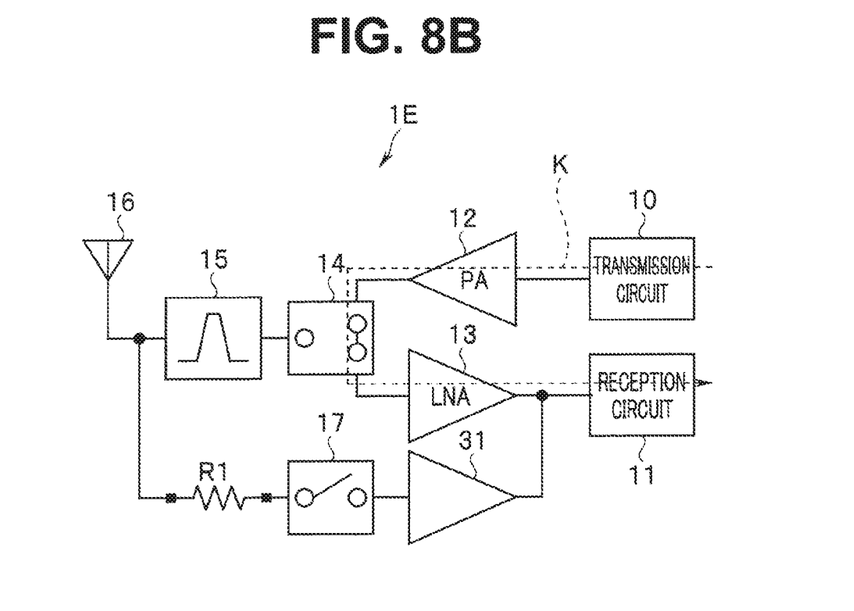
FIG. 8B is a block diagram illustrating the configuration of the distance measuring device according to the sixth embodiment.

FIGS. 8A and 8B are block diagrams illustrating a configuration of a distance measuring device according to the sixth embodiment. The same reference numerals will be given to components in FIGS. 8A and 8B that are similar to the components in FIG. 5, and description will be omitted.

As illustrated in FIGS. 8A and 8B, a distance measuring device IE according to the embodiment is configured such that the switch 18, the switch 19, and the signal processing circuit 32 are deleted from the distance measuring device 1B in FIG. 5. The other components are similar to the components in the distance measuring device 1B in FIG. 5.

In the embodiment, it is assumed that the delay time of the BPF 15 is not affected by impedances of circuits before and after the BPF 15. In this case, the delay time Tfil' of the BPF 15 at the time of transmission and the delay time Tfil" at the time of reception are the same. Thus, the delay time of the BPF 15 at the time of transmission and the delay time at the time of reception are defined as a delay time Tfil in the embodiment. Further, it is assumed that the delay time Tlna of the LNA 13 and a delay time Trxsub of the signal processing circuit 31 are also the same.

Under the aforementioned conditions, a delay time Ttxtot3 at the time of transmission and a delay time Trxtot3 at the time of reception can be obtained through measurement performed twice for a loop J and a loop K.

First, the switch 14 is switched to establish connection between the PA 12 and the BPF 15 as illustrated in FIG. 8A. Then, the switch 17 is turned on, and a route for the loop J is thus formed.

A delay time Tj of the loop J is a time obtained by adding the delay time Ttx of the transmission circuit 10, the delay time Tpa of the PA 12, the delay time Tfil of the BPF 15, the delay time Trxsub of the signal processing circuit 31, and the delay time Trx of the reception circuit 11. In other words, the delay time Tj of the loop J is represented by Equation (4) below.

$$Tj=Ttx+Tpa+Tfil+Trxsub+Trx \quad (4)$$

Next, the switch 14 is switched to establish connection between the PA 12 and the LNA 13 as illustrated in FIG. 8B. Then, the switch 17 is turned off, and a route for the loop K is thus formed.

A delay time Tk of the loop K is a time obtained by adding the delay time Ttx of the transmission circuit 10, a delay time Tpa of the PA 12, the delay time Tlna of the LNA 13, and the delay time Trx of the reception circuit 11. In other words, the delay time Tk of the loop K is represented by Equation (5) below.

$$Tk=Ttx+Tpa+Tlna+Trx \quad (5)$$

Here, Tj+(Tj−Tk) is calculated. Note that Tlna=Trxsub is established as described above.

$$\begin{aligned} Tj + (Tj - Tk) &= (Ttx + Tpa + Tfil + Trxsub + Trx) + \\ &\quad (Ttx + Tpa + Tfil + Trxsub + Trx) - \\ &\quad (Ttx + Tpa + Tlna + Trx)) \\ &= (Ttx + Tpa + Tfil + Trxsub + Trx) + \\ &\quad (Tfil + Trxsub - Tlna) \\ &= Ttx + Tpa + Tfil + Tlna + Trx + Tfil \\ &= Ttxtot3 + Trxtot3 \end{aligned}$$

In this manner, it is possible to accurately obtain the delay time Ttxtot3 at the time of transmission and the delay time Trxtot3 at the time of reception by measuring the delay time Tj of the loop J and the delay time Tk of the loop K and calculating Tj+(Tj−Tk).

As described above, it is possible to obtain the delay time Ttxtot3 at the time of transmission and the delay time Trxtot3 at the time of reception through measurement performed twice and thereby to shorten a measurement time of the delay time in the embodiment as compared with the first embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A distance measuring device comprising:
   a transmission circuit configured to transmit a signal for distance measurement;
   a reception circuit configured to receive the signal for distance measurement;
   a filter configured to restrict the signal for distance measurement transmitted from the transmission circuit and a signal for distance measurement received by an antenna within a desired frequency band;
   a first switching circuit configured to switch a route between the transmission circuit and the antenna and a route between the reception circuit and the antenna;
   an impedance adjustable circuit configured to have a higher impedance than an impedance of the antenna;
   a second switching circuit configured to switch conduction and non-conduction between the impedance adjustable circuit and the transmission circuit;
   a third switching circuit configured to switch conduction and non-conduction between the impedance adjustable circuit and the reception circuit; and
   a fourth switching circuit configured to switch conduction and non-conduction between the impedance adjustable circuit and the second switching circuit and conduction and non-conduction between the impedance adjustable circuit and the third switching circuit.

2. The distance measuring device according to claim 1, wherein the impedance adjustable circuit is a resistor.

3. The distance measuring device according to claim 1, wherein the fourth switching circuit has a higher impedance than the impedance of the antenna.

4. The distance measuring device according to claim 1, further comprising:
   a first signal processing circuit disposed between the second switching circuit and the transmission circuit and configured to perform desired signal processing; and
   a second signal processing circuit disposed between the third switching circuit and the reception circuit and configured to perform desired signal processing.

5. The distance measuring device according to claim 4, wherein the first signal processing circuit and the second signal processing circuit are each an amplifier or an attenuator.

6. A distance measuring device comprising:
   a transmission circuit configured to transmit a signal for distance measurement;
   a reception circuit configured to receive the signal for distance measurement;
   a first switching circuit configured to switch a route between the transmission circuit and an antenna and a route between the reception circuit and the antenna;
   an impedance adjustable circuit adjusted to have a higher impedance than an impedance of the antenna;
   a second switching circuit configured to switch conduction and non-conduction between the impedance adjustable circuit and the transmission circuit;
   a third switching circuit configured to switch conduction and non-conduction between the impedance adjustable circuit and the reception circuit; and
   a fourth switching circuit configured to switch conduction and non-conduction between the impedance adjustable circuit and the second switching circuit and conduction and non-conduction between the impedance adjustable circuit and the third switching circuit,
   wherein at least one of a filter configured to restrict the signal for distance measurement transmitted from the transmission circuit and a signal for distance measurement received by the antenna within a desired frequency band, a first amplifier configured to amplify the signal for distance measurement, and a second amplifier configured to amplify the signal for distance measurement is not included.

* * * * *